United States Patent
Guenter et al.

(10) Patent No.: US 9,633,293 B2
(45) Date of Patent: *Apr. 25, 2017

(54) FAR VIEW TWO-DIMENSIONAL SYMBOLOGY

(71) Applicant: International Business Machines Corporation, Armonk, NY (US)

(72) Inventors: Erich Guenter, Frankfurt (DE); Mark E. Maresh, RTP, NC (US); Juan F. Vargas, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,703

(22) Filed: Apr. 27, 2015

(65) Prior Publication Data
US 2016/0314386 A1     Oct. 27, 2016

(51) Int. Cl.
*G06K 19/06*     (2006.01)
(52) U.S. Cl.
CPC . *G06K 19/06037* (2013.01); *G06K 19/06056* (2013.01)
(58) Field of Classification Search
CPC .............. G06K 1/121; G06K 19/06037; G06K 19/06056
See application file for complete search history.

(56) References Cited

U.S. PATENT DOCUMENTS

| | | | |
|---|---|---|---|
| 5,612,524 A | 3/1997 | Sant'Anselmo et al. | |
| 6,533,181 B1 | 3/2003 | Roxby et al. | |
| 7,412,089 B2 | 8/2008 | Squires et al. | |
| 7,751,585 B2 * | 7/2010 | Jancke | G06K 19/06037 235/494 |
| 8,047,447 B2 * | 11/2011 | Bulan | G06K 7/14 235/462.01 |
| 8,702,011 B2 * | 4/2014 | Farn | G06K 19/0614 235/454 |
| 8,820,628 B2 | 9/2014 | McKinnon | |
| 8,931,700 B2 * | 1/2015 | Tian | G06K 19/0614 235/435 |
| 9,111,161 B2 * | 8/2015 | Ming | G06K 7/10712 |

(Continued)

OTHER PUBLICATIONS

Wikipedia; Data Matrix, http://en.wikipedia.org/wiki/Data_matrix_%28computer%29, Apr. 15, 2015.

(Continued)

*Primary Examiner* — Christie I Marshall
(74) *Attorney, Agent, or Firm* — Garg Law Firm, PLLC; Rakesh Garg; Damion Josephs

(57) ABSTRACT

To encode information into a two-dimensional (2D) symbol, a palette is selected to represent data in the 2D symbol, the palette including a set of shape fillers. A Base number system is selected according to the palette. A rule is selected, where the rule determines a manner of reading an encoded form of the data from the 2D symbol. The rule and the data are encoded as a set of shapes, where the shapes in the set of shapes are configured using the palette and arranged into a grid pattern, with or without visible grid lines, to form the 2D symbol. The 2D symbol is output in a size that matches an area.

19 Claims, 10 Drawing Sheets

(56) References Cited

U.S. PATENT DOCUMENTS

| | | | | |
|---|---|---|---|---|
| 2002/0134841 A1* | 9/2002 | Oakeson | ......... | G06K 19/06028 |
| | | | | 235/462.25 |
| 2013/0161395 A1* | 6/2013 | Tian | ................ | G06K 19/06056 |
| | | | | 235/462.04 |
| 2013/0161396 A1* | 6/2013 | Ming | ................ | G06K 7/10712 |
| | | | | 235/462.04 |
| 2014/0042232 A1* | 2/2014 | Farn | .................. | G06K 19/0614 |
| | | | | 235/494 |
| 2015/0069140 A1* | 3/2015 | Ming | ................ | G06K 7/10712 |
| | | | | 235/494 |

OTHER PUBLICATIONS

Wikipedia; EZ Code, http://en.wikipedia.org/wiki/EZcode, Jan. 26, 2015.

Phillips and Company; Phillips & Company Launches QR Code Service from Space, Transforming Rooftops into Dynamic Marketing Tool, http://phillipscompany.com/news/phillips-company-launches-qr-code-service-from-space-enabling-any-business-to-transform-its-rooftop-into-a-dynamic-marketing-tool-through-google-earth-google-maps/, 2015.

* cited by examiner

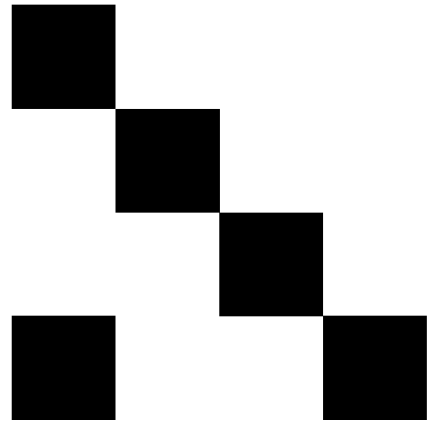
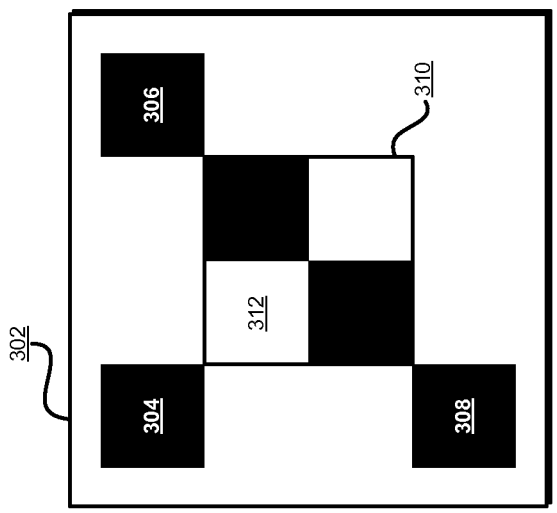

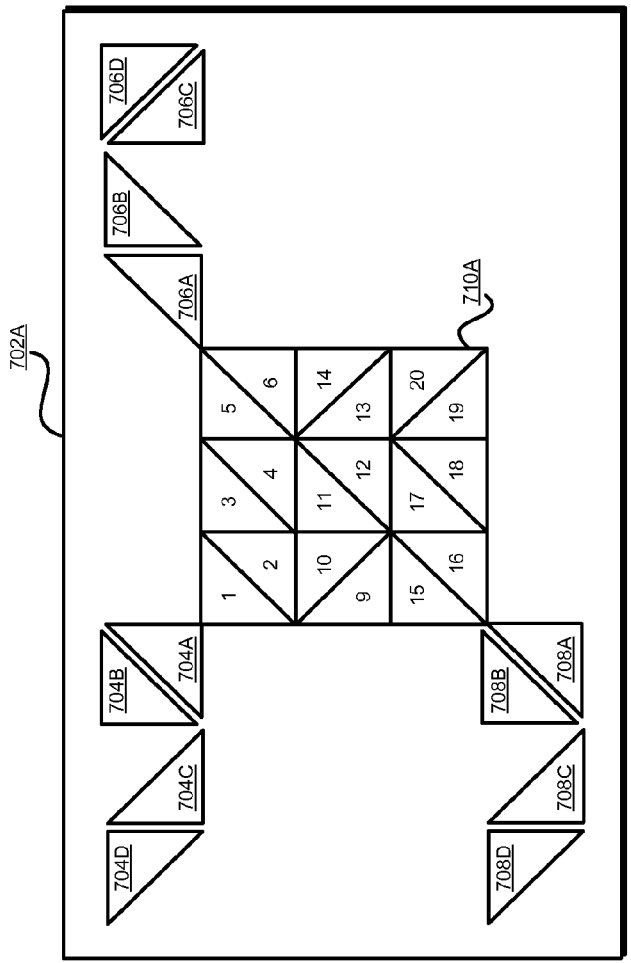
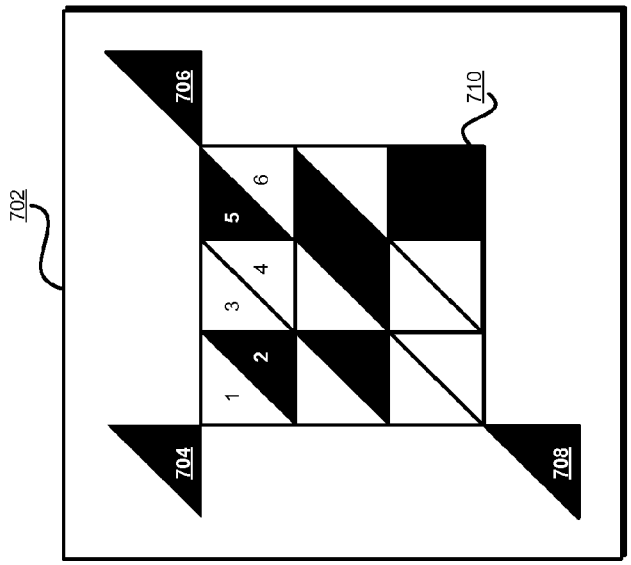
FIGURE 7

FAR VIEW TWO-DIMENSIONAL SYMBOLOGY

TECHNICAL FIELD

The present invention relates generally to a system, and computer program product for coding information using two-dimensional (2D) symbols. More particularly, the present invention relates to a system, and computer program product for creating Far View (FV) two-dimensional symbology.

BACKGROUND

A barcode is an existing machine-readable representation of data using lines or bars of varying thicknesses parallelly spaced relative one another in a specified area. This type of barcode is referred to as a one-dimensional barcode (1D-barcode), and are commonly seen printed on or associated with products, publications, displays, labels, and documents. Uniform Product Code (UPC) and UPC-A and UPC-E variants thereof, EAN-8, EAN-13, ITF-14, Code128, Code39 are some examples of 1D-barcodes used in the retail industry.

Several forms of two-dimensional barcodes, or two-dimensional codes (2D codes) are also presently available. Quick Response code (QR code) is a well-known example of 2D-codes (QR code is a registered trademark of Denso Wave Incorporated, in the United States and in other countries). PDF417, DataMatrix, MaxiCode, GridMax, Aztec code, and ShotCode are some examples of 2D-barcodes used in a variety of industries (any code named herein, which is also a trademark, is owned by its respective owner).

A 1D-barcode carries a small amount of information, usually just enough to represent ten or twenty alphanumeric characters as an example. A 2D-code on the other hand can be configured to carry different amounts of data. Extreme cases of 2D-codes have been configured to carry even several kilobytes of data.

SUMMARY

The illustrative embodiments provide a system, and computer program product for creating far view two-dimensional symbology. An embodiment for encoding information into a two-dimensional (2D) symbol. selects a palette to represent data in the 2D symbol, the palette comprising a set of shape fillers. The embodiment selects a Base number system according to the palette. The embodiment selects a rule, wherein the rule determines a manner of reading an encoded form of the data from the 2D symbol. The embodiment encodes the rule and the data as a set of shapes, wherein the shapes in the set of shapes are configured using the palette and arranged into a grid pattern, with or without visible grid lines, to form the 2D symbol. The embodiment outputs the 2D symbol in a size that matches an area.

Another embodiment includes a computer usable program product comprising a computer readable storage device including computer usable code for encoding information into a two-dimensional (2D) symbol.

Another embodiment includes a data processing system for encoding information into a two-dimensional (2D) symbol.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3A depicts a block diagram of an example FV code in accordance with an illustrative embodiment;

FIG. 7 depicts a block diagram of an example FV code in accordance with an illustrative embodiment;

DETAILED DESCRIPTION

Figure 1:
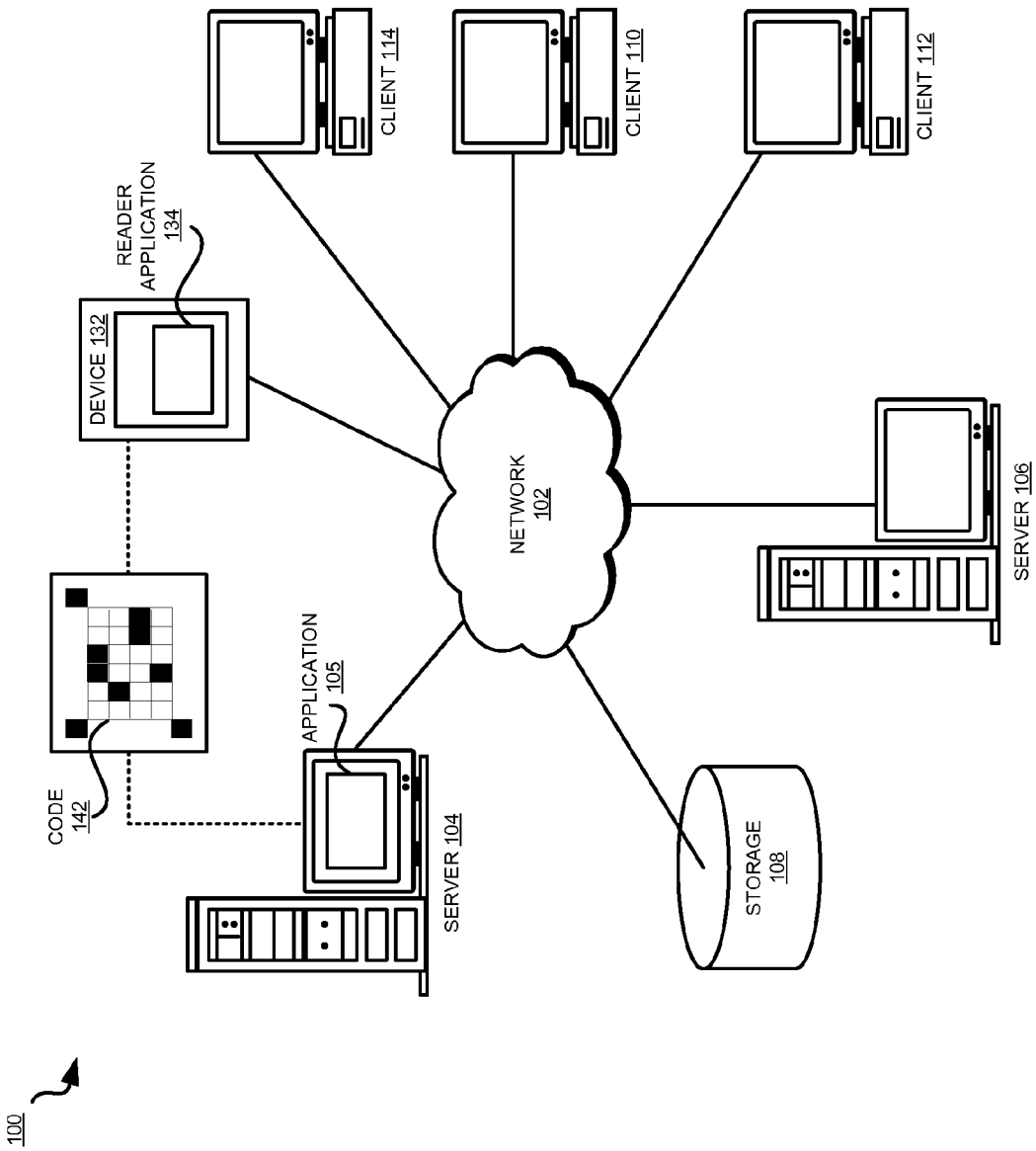
FIG. 1 depicts a block diagram of a network of data processing systems in which illustrative embodiments may be implemented.

The illustrative embodiments recognize that a need exists for coded information to be presented in large-formats, such as billboards, roof-tops, building elevations, game-fields, areas and structures visible from space, and other large areas in various planes. Presently, the only way to display or present existing 1D-barcodes and 2D-codes (collectively hereinafter, "existing codes" unless expressly distinguished where used) is to enlarge an existing code to fill the given area.

The illustrative embodiments recognize that many existing codes are unsuitable for scaling or enlargement due to the proportionality or dimensional requirements of the specifications on which they are based. For example, a 1D-barcode, if stretched into a longer than specified length of a rectangular area can cause a barcode reader to either not read the code or incorrectly read the code.

The illustrative embodiments also recognize that many existing codes that can be scaled to fit an area are generally unsuitable for presentation in large areas for other reasons. For example, a QR code can be scaled up to fit a five thousand square feet area of a roof-top. However, a QR code is complex and may be difficult to paint on such a large area with the required degree of accuracy so that a QR code reader will be able to decode it when reading the large-format QR code, such as from a satellite in orbit. Therefore, the illustrative embodiments recognize that the complexity of the existing codes, the rendering precision required for accurately reading an existing code in large-format, the reading angle required to read an existing code in large-format (both skew and tilt) and many other factors render existing codes unsuitable for use in large-formats.

Not only is the large-format rendering of existing codes problematic, their complexity can often cause errors when reading them on a smaller scales as well. For example, a complex QR code or 2D barcode has minute graphical patterns that must be printed accurately and presented on an even surface for a reader to read the existing code accurately. This becomes particularly problematic when the existing code has to be printed or affixed on a surface that is not flat, or presents all or parts of the existing code at different angles to the reader, or when all or parts of the existing code are obscured or distorted for any reason.

Furthermore, existing codes are static representations of data. An existing code always represents the data in the form specified in the code's specification. For example, a 1D-barcode is limited to a string of characters. For example, suppose that the string is "ABC-123". The string "ABC-123" will be encoded by a specific ordered set of bars according to Code128. That specific ordered set of bars is immutable for "ABC-123" under Code128, regardless of what ABC-123 represents.

Similarly, data "xyzcompany.com" encoded into a QR code always corresponds to that representation under that QR code specification, and that specification-compliant representation always means "xyzcompany.com".

The illustrative embodiments recognize that such a static manner of data representation using existing codes is too limiting. The illustrative embodiments recognize that existing codes contain no rules to read the data contained in the existing code.

In other words, an existing code itself cannot inform a reader, how to read or extract the data encoded therein. For example, presently, "1234567190" encoded in a specification-compliant existing code cannot be read as "(123)456-7190"—a phone number, and "123.45.67.190"—an internet protocol (IP) address, by specifying different extraction rules in the existing code.

As an example, if the existing code were a QR code according to a QR code specification, the QR code would have to specifically encode string and data identifier "(123) 456-7190" so that a reader extracts the digits as a phone number; encoding the string "1234567190" will not cause such a reading. And the QR code would have to specifically encode string "123.45.67.190" so that a reader extracts the digits as an IP address; encoding the string "1234567190" will not cause such a reading.

The illustrative embodiments used to describe the invention generally address and solve the above-described problems and other problems related to machine-readable representation of data. The illustrative embodiments provide a system, and computer program product for creating far view two-dimensional symbology.

A far-view code (FV code) is a machine-readable representation of data in 2D according to an embodiment. An FV code uses simple geometric shapes that are easily scaled for large-format printing, painting, display, rendering, or presenting. The geometric shapes can be arranged in any number of rows and columns, not necessarily in equal numbers of rows and columns to form a square, and bound only by a defined boundary.

One or more markers associated with the FV code define the boundary of the resulting grid of shapes in the FV code. One or more markers associated with the FV code are usable to orient a reader to read the shapes from the rows and columns of the grid in a prescribed sequence. One or more markers associated with the FV code are usable to calibrate the reader, to wit, provide the reader information about a dimension, an edge, a vertex, a size, a color or fill, or some combination thereof, used in a shape in the grid of the FV code.

A shape in the grid of the FV code can be colored or filled. In the simplest form of an FV code according to an embodiment, the shapes can use a color palette comprising black and white colors as fill colors or fills. In a more complex form of FV code according to another embodiment, the FV code uses a palette of any number of distinct colors or fill-patterns. For example, one palette may comprise three colors, another palette may comprise sixteen colors, another palette may comprise four fill patterns, another palette may comprise eight distinct shades of a color, and another palette may comprise some combination of colors, fill patterns, shades, to form n distinct fills for the shapes in a grid of an FV code.

The size of the palette determines the Base number system used to encode data in the shapes. For example, when the palette uses two colors, e.g., black and white, a shape can be colored black (or white) to represent Binary 0, and the other color, e.g., white (or Black), represents Binary 1. Similarly, if the palette uses ten colors, shades, or fill patterns, a shape of a first color, shade, or pattern represents Decimal 1, a shape of a second color, shade, or pattern represents Decimal 2, a shape of a third color, shade, or pattern represents Decimal 3, a shape of a fourth color, shade, or pattern represents Decimal 4, a shape of a fifth color, shade, or pattern represents Decimal 5, a shape of a sixth color, shade, or pattern represents Decimal 6, a shape of a seventh color, shade, or pattern represents Decimal 7, a shape of an eighth color, shade, or pattern represents Decimal 8, a shape of a ninth color, shade, or pattern represents Decimal 9, and a shape of a tenth color, shade, or pattern represents Decimal 0.

Similarly, a palette of sixteen colors, shades, or patterns can be used to encode the data using Hexadecimal number system into the FV code. Generally, depending upon the size of palette used, to wit, the number of distinct colors, shades, or patterns used to fill the shapes in the grid of an FV code, the FV code can be configured to encode the given data using a corresponding Base number. In one embodiment, an absence of color, an absence of fill, or an absence of a pattern is counted as a color, fill, or pattern, respectively, towards the count of the colors, shades, or patterns in the palette.

An FV code further includes a rule section and a data section. A reading rule is encoded into the rule section, such that a manner of reading the encoded data section is configured according to the reading rule from the rule section. For example, suppose that the data encoded in the data section of an example FV code is string "1234567190". In one instance of the FV code, the rule section within the FV code dictates that the data is to be read in 3-3-4 pattern, which is a common phone number pattern in the United States. Accordingly, the reader of the FV code reads, string "1234567190" as "123-456-7190".

In another instance of the FV code, the rule section within the FV code dictates that the data is to be read in 3.2.2.3 pattern, which is an IP version 4 (IPv4) address pattern. Accordingly, the reader of the FV code reads, string "1234567190" as "123.45.67.190".

In one embodiment, the rule section is of a fixed length, i.e., a fixed number of shapes in a known location in the grid of the FV code. For example, the first four shapes in the first row beginning from the leftmost column may encode the rule, and all shapes in the remainder of the first row, if any, and subsequent rows until the last column in the last row encode the data.

Generally, the shapes in the grid are traversed from a designated first shape to a designated last shape in some order. For example, the FV code grid may be traversed left-to-right, top-to-bottom, making the leftmost shape in the topmost row the first shape, and making the rightmost shape in the bottom-most row the last shape to be read.

Generally, the rule section can occupy any number of shapes in any number of rows and columns, and the data can occupy the remaining number of shapes in the given FV code. For example, in one embodiment, the rule shapes occupy the first n columns in the first row; in another embodiment, the rule shapes occupy the first n shapes, which can wrap into multiple rows of the grid; and in another embodiment, the rule shapes occupy the first n columns of m rows.

In another embodiment, the rule section is demarcated in the grid. For example, in one embodiment, a delimiter character separates the rule section from the data section in the grid. A reader reads the shapes from the first shape up to the shape(s) that encode the delimiter as encoding a reading rule. The reader reads the shapes after the shapes encoding the delimiter as encoding the data that is to be read according to the rule.

In another embodiment, a delimiter character marks the beginning of the rule section, and the same or different delimiter character marks the end of the rule sections. This manner of embedding the rule into the FV code allows the rule to be embedded anywhere within the data, in a floating manner. For example, in an example grid, shapes 1-55 may encode data, shapes 56-59 encode a start delimiter, shapes 60-75 encode a rule, shapes 76-79 encode an end delimiter, and shapes 80-240 may encode more data in the grid.

When a reader reads a rule in the FV code, the reader configures itself to read the data section according to the rule. In one embodiment, this configuring occurs with the help of an application associated with the reader, such as a device driver of the reader, an application embedded in the reader hardware, or an application accessible to the reader over a data channel or network. For example, if the rule shapes encode Binary 0101, such an application instructs the reader that the data will be read as an IPv4 address, and if the rule shapes encode Binary 0100, such an application instructs the reader that the data will be read as a phone number in the form used in the United States. Generally, any number of shapes can encode a rule, therefore, any number of rules can be encoded in various FV code. Correspondingly, a reference table in the application of the reader can include any number of (rule code, reading instructions) pairs.

An FV code can even encode multiple rules and multiple corresponding data sections using one or more techniques described herein. For example, in an example grid, shapes 1-4 may encode rule R1, shapes 5-44 encode data D1 that is to be read according to rule R1; shapes 45-48 may encode rule R2, shapes 49-88 encode data D2 that is to be read according to rule R2; and so on. A rule section can be associated with a data section in other manners as well, such as by using section identifiers, different matching delimiters, and so on. These and other similarly purposed manners of associating a rule section with a data section are contemplated within the scope of the illustrative embodiments.

A method of an embodiment described herein, when implemented to execute on a device or data processing system, comprises substantial advancement of the functionality of that device or data processing system in encoding data in a machine readable manner. For example, the existing codes of the prior-art are difficult and error-prone in large-format reproductions, and encode the data such that the data has to be read exactly as encoded. The embodiments use simple geometric shapes and use-specific palette to encode data. Such shapes and palettes are conducive to large-format reproduction because of the simplicity of drawing and filling repetitive geometric shapes on any scale. Furthermore, an FV code can encode the data in one form and allow a reader to read the data in another form according to a rule that is also embedded within the FV code. Such manner of encoding data is unavailable in presently available devices or data processing systems. Thus, a substantial advancement of such devices or data processing systems by executing a method of an embodiment improves the use of machine-readable representations of data in large-format, and allows the machine reading to change by changing a rule while the data encoding remains unchanged.

The illustrative embodiments are described with respect to certain shapes, colors, shades, patterns, palettes, sizes, Base number systems, grid and grid size, section and section sizes, delimiters and delimiter sizes, rules, reader and the application associated with the reader, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or their architectures, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
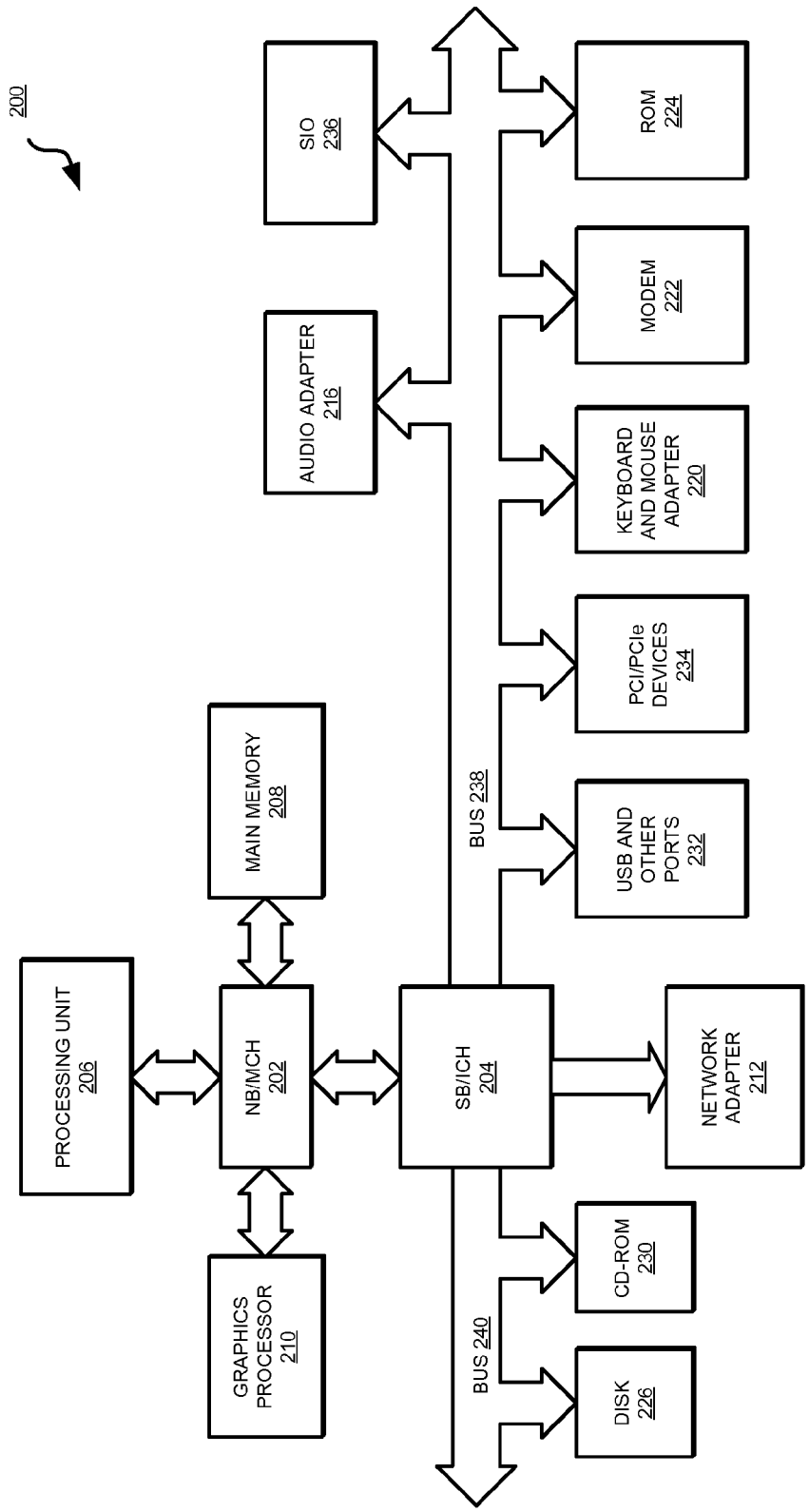
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 105 implements an embodiment described herein. Application 105 generates code 142, which is an example of an FV code according to an embodiment. Device 132 operates as a reader usable to read FV code 142. Application 134 is an application associated with reader 132, and provides reading instructions to reader 132 to read a data section in FV code 142 according to a rule section read from FV code 142.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD)

or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and reader application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

With reference to FIG. 3A, this figure depicts a block diagram of an example FV code in accordance with an illustrative embodiment. FV Code 302 is an example of code 142 in FIG. 1.

Code 302 uses a palette of two colors, e.g., black and white as shown in FIG. 3, in square shapes to represent Binary encoding. Markers 304, 306, and 308 are the same square shapes that are used to encode data in grid 310. In the depicted simple example, markers 304, 306, and 308 operate to orient the reader, to wit, identify the first shape in grid 310. When scanning or reading FV code 302, the reader (not shown) identifies marker 304 as the top left corner, marker 306 as the top right corner, and marker 308 as the bottom left corner of FV code 302, thereby learning that shape 312 is the first shape in grid 310. Note that in FV code 142, FV code 302, and other FV codes depicted in the various figures, a grid, such as grid 310, is depicted only for the clarity of the depiction and description and not as a needed part of an FV code. For example, the vertical and horizontal separator lines that separate the various shapes, such as shape 312 within grid 310, are not expressly painted or printed as lines in an actual FV code according to an embodiment. The outer rectangle of grid 310, which encloses the four example shapes such as shape 312, is also not expressly painted or printed as a rectangle in an actual FV code according to an embodiment. An "as printed or presented" view of FV code 302 is depicted in FIG. 3A, and shows how FV code 302 would actually appear in print or paint. Unless an express border or separator line is specifically described as being a part of an FV code depicted in a figure herein, the FV codes in other figures are similarly printed or presented without those separator lines or borders. In the depicted simple example, markers 304, 306, and 308 also operate to identify the boundary of FV code 302 to the reader, to wit, identify the length and the height or width of FV code 302. When scanning or reading FV code 302, the reader (not shown) identifies the distance from marker 304 to marker 306 as the length of FV code 302, and the distance from marker 304 to marker 308 as the height or width of FV code 302, thereby learning that dimensions of grid 310.

In the depicted simple example, one or more of markers 304, 306, and 308 also operate to calibrate the reader, to wit, define for the reader the size or dimensions of each shape in grid 310. When scanning or reading FV code 302, the reader (not shown) identifies any one of marker 304, marker 306, and marker 308, and measures the marker. For example, the measurements provides the reader one or more sizes of the edges of the shape of the marker, a number of edges in the marker, a number of vertices in the marker, one or more angles between the edges in the marker, or some combination thereof, to establish a geometric shape and size of the marker. The shape and size of the marker calibrate the reader to read grid 310 as comprising of similar shapes of similar sizes.

This calibration is particularly useful if, for example, two shapes adjacent to each other are of the same color, thereby forming a larger different shape of the color, which has to be divided into the constituent two shapes. The reader, having been calibrated using marker 304, 306, or 308, can divide the larger shape into the constituent shapes of the calibrated shape and size.

The reader, having been oriented and calibrated, and the grid having been bounded in this example manner, FV code 302 is read. The reader begins reading grid 310 starting at shape 312 and reading the blocks sequentially till the end of the top row, then dropping to the next row and reading from the leftmost shape in that next row till the end shape in that next row.

In the depicted example, suppose that Black shape represents Binary 1 and White shape represents Binary 0. Accordingly, the reader reads "0110" from grid 310 in FV code 302.

Figure 3B:
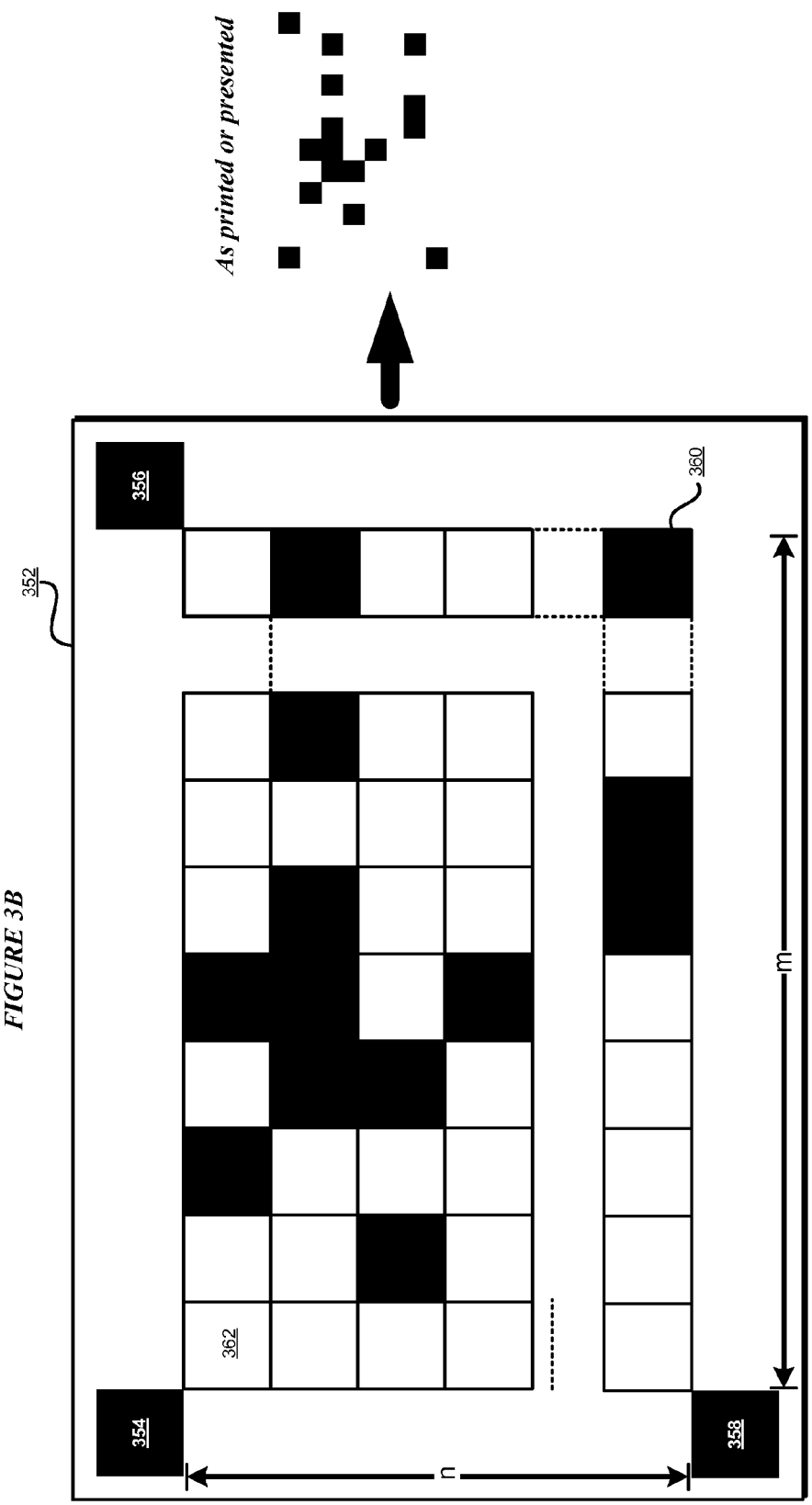
FIG. 3B depicts a block diagram of another example FV code in accordance with an illustrative embodiment.

With reference to FIG. 3B, this figure depicts a block diagram of another example FV code in accordance with an illustrative embodiment. FV Code 352 is another example of code 142 in FIG. 1. Markers 354, 356, and 358 operate in the manner of markers 304, 306, and 308, respectively, to orient and calibrate the reader and define the boundary of grid 360. An "as printed or presented" view of FV code 352 is depicted in FIG. 3B, and shows how FV code 352 would actually appear in print or paint. Any border or separator line shown in this figure is only illustrated for clarity of the description and is not a part of any FV code depicted in this figure.

An FV code need not employ a square grid. Here, grid 360 is a rectangle and comprises n rows or m columns, as compared to a 2×2 square grid 310 in FIG. 3A. Shape 362 operates in a manner similar to shape 312 in FIG. 3A.

Figure 4:
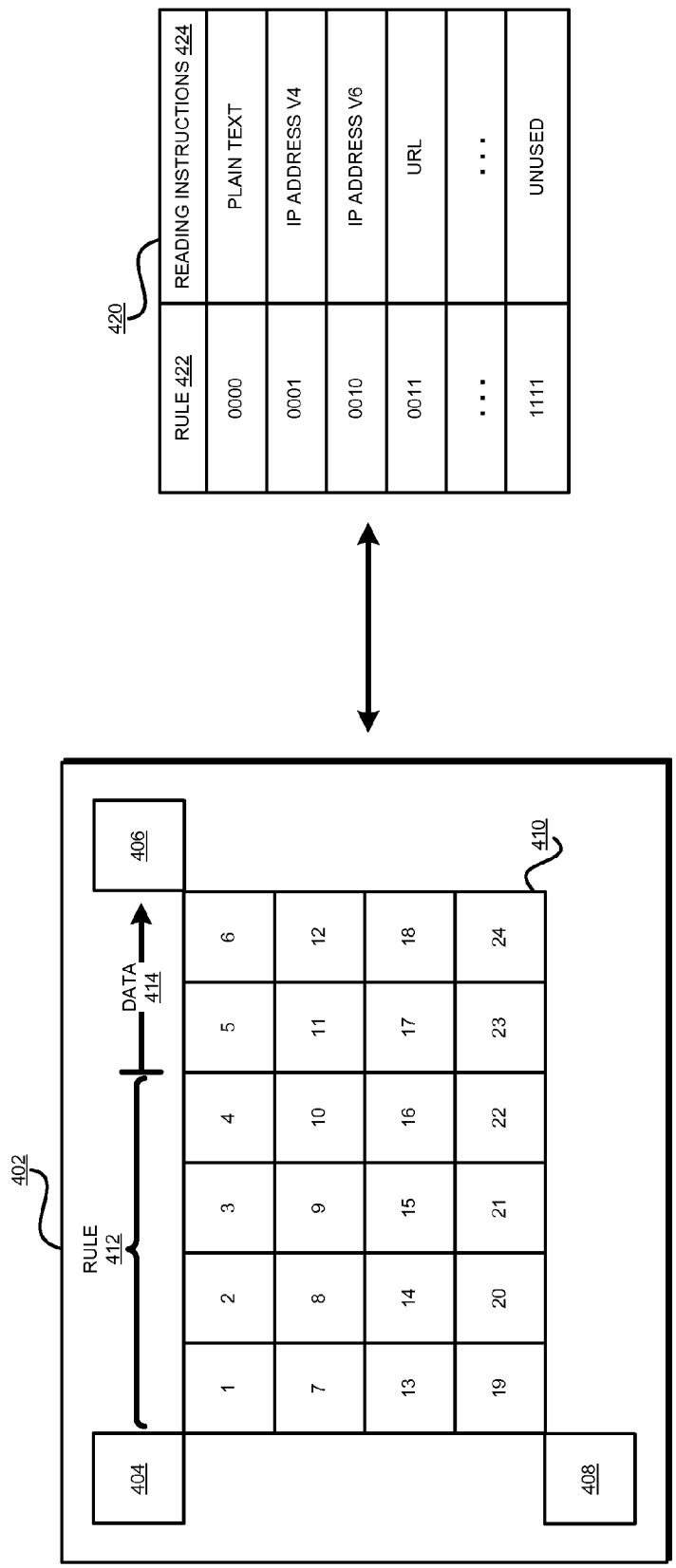
FIG. 4 depicts a block diagram of an example FV code comprising an example rule section and an example data section in accordance with an illustrative embodiment.

With reference to FIG. 4, this figure depicts a block diagram of an example FV code comprising an example rule section and an example data section in accordance with an illustrative embodiment. FV Code 402 is an example of FV code 352 in FIG. 3B. Markers 404, 406, and 408 operate in the manner of markers 354, 356, and 358, respectively. Grid 410 operates in the example manner of grid 352 in FIG. 3B. Any border or separator line shown in this figure is only illustrated for clarity of the description and is not a part of any FV code depicted in this figure.

Only as a non-limiting example, suppose that FV code 402 employs a fixed length rule section. For example, rule section 412 occupies shapes 1, 2, 3, and 4 as shown. Shapes 5-24 are occupied by data section 414. In other words, a properly oriented and calibrated reader begins reading at shape 1 in grid 410 and regards the data as a rule to read data section 414. The reader extracts the encoded data of shapes 1-4 according to the Number system based on the palette used.

An application associated with the reader, such as application 134 in FIG. 1, includes reference table 420. Table 420 can take any suitable form without limitation to contain any number of the (rule code, reading instructions) pairs.

Assuming, only as a simplified example, that the rules are expected to be four Binary bits in length, the reader looks up the contents of shapes 1-4 in column 422 of table 420, and obtains the corresponding instructions from column 424.

Suppose, for example, shapes 1-4 were White, White, White, and Black, respectively, and the palette of FV code 302 was used in FV code 402. Accordingly, shapes 1-4 in rule section 412 were encoded as Binary 0001. Table 420 provides that when the rule section 412 provides rule value 0001, data section 414 has to be read as an IPv4 address.

Here, 20 shapes from shape 5 through shape 24 encode an IPv4 address. For example, data section 414 may contain data 1038240, which is read as a subnet address of 103.82.40.000, where the "000" is implied according to a rule from the data of FV code 402.

Figure 5:
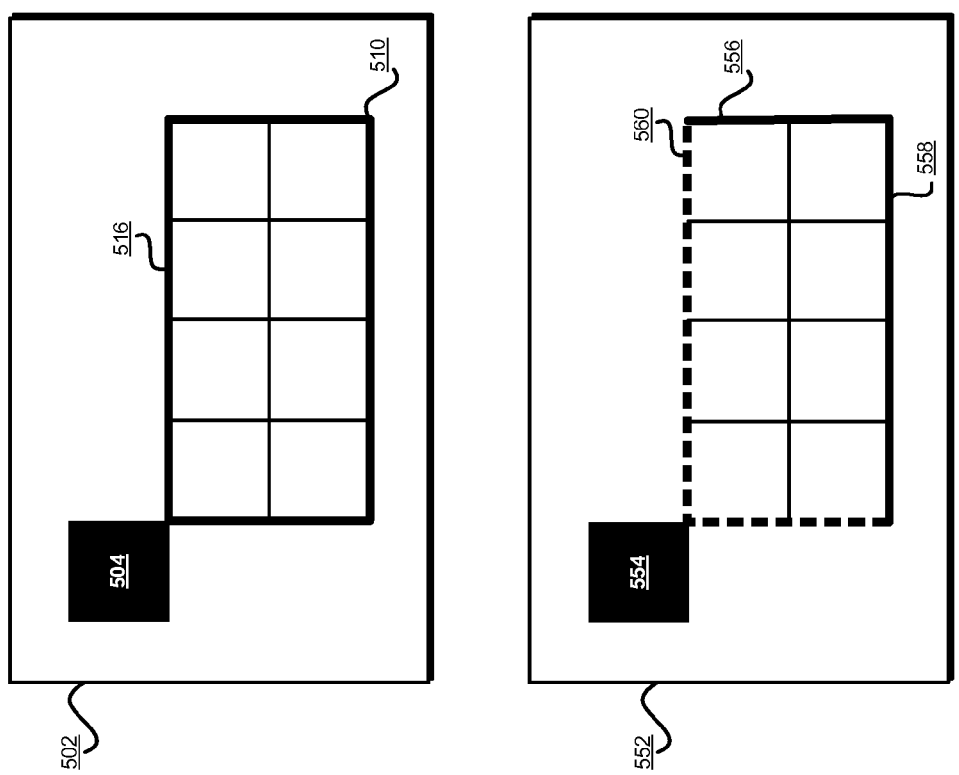
FIG. 5 depicts a block diagram of an example FV code in accordance with an illustrative embodiment.

With reference to FIG. 5, this figure depicts a block diagram of an example FV code in accordance with an illustrative embodiment. FV Code 502 is an example of FV code 302 in FIG. 3A, FV code 352 in FIG. 3B, or FV code 402 in FIG. 4.

An FV code according to an embodiment can be implemented using less than three marker shapes. For example, FV code 502 employs a single marker shape-shape 504. Marker 504 is usable in the manner of marker 304 to orient a reader. For example, the reader orients FV code 502 such that marker 504 is at the top left corner of FV code 502.

Marker 504 is usable in the manner of marker 304 to calibrate a reader. For example, the reader determines a shape and size of marker 504, and uses that determined shape and size to identify and read the shapes in grid 510.

Border 516 defines a boundary of grid 510 instead of markers 306 and 308 as in FIG. 3A. In a non-limiting example, a solid line around the shapes contained within grid 510 indicates to the reader that the solid line is the boundary of grid 510. Accordingly, the reader measures the length and height or width of boundary 516 to bound grid 510. Boundary 516 forms a border that is a part of the FV code depicted in this figure. Any separator lines shown in this figure are only illustrated for clarity of the description and are not a part of any FV code depicted in this figure.

The boundary can be defined in other ways. For example, in another non-limiting example, solid line 556 at the right edge of the grid that is farthest from marker 554, and solid line 558 at the bottom edge of the grid that is farthest from marker 554, indicates to the reader the boundary of the grid. Particularly, the distance from the vertex of marker 554 that contacts grid 560, to line 556 is the length of grid 560, and the distance from the vertex of marker 554 that contacts grid 560, to line 558 is the height or width of grid 560. The dashed lines are not actually present in FV code 552 and are depicted only to represent the boundary determined by the reader in this manner. Boundary lines 556 and 558 form a border that is a part of the FV code depicted in this figure. Any separator lines shown in this figure are only illustrated for clarity of the description and are not a part of any FV code depicted in this figure.

Essentially, some combination of marker shapes such as shapes 304, 306, 308, 504, and 554, and boundary lines such as lines 516, 556, and 558, or some combination thereof, can be used to correctly orient an FV code for reading, calibrate a reader to recognize the shapes used in the FV code, and define the boundary of the FV code. These example configurations in FIGS. 3A, 3B, 4, and 5 are not intended to be limiting. From this disclosure, those of ordinary skill in the art will be able to conceive many other ways of adapting an FV code for proper orientation, calibration, and bounding, and the same are contemplated within the scope of the illustrative embodiments.

Figure 6:
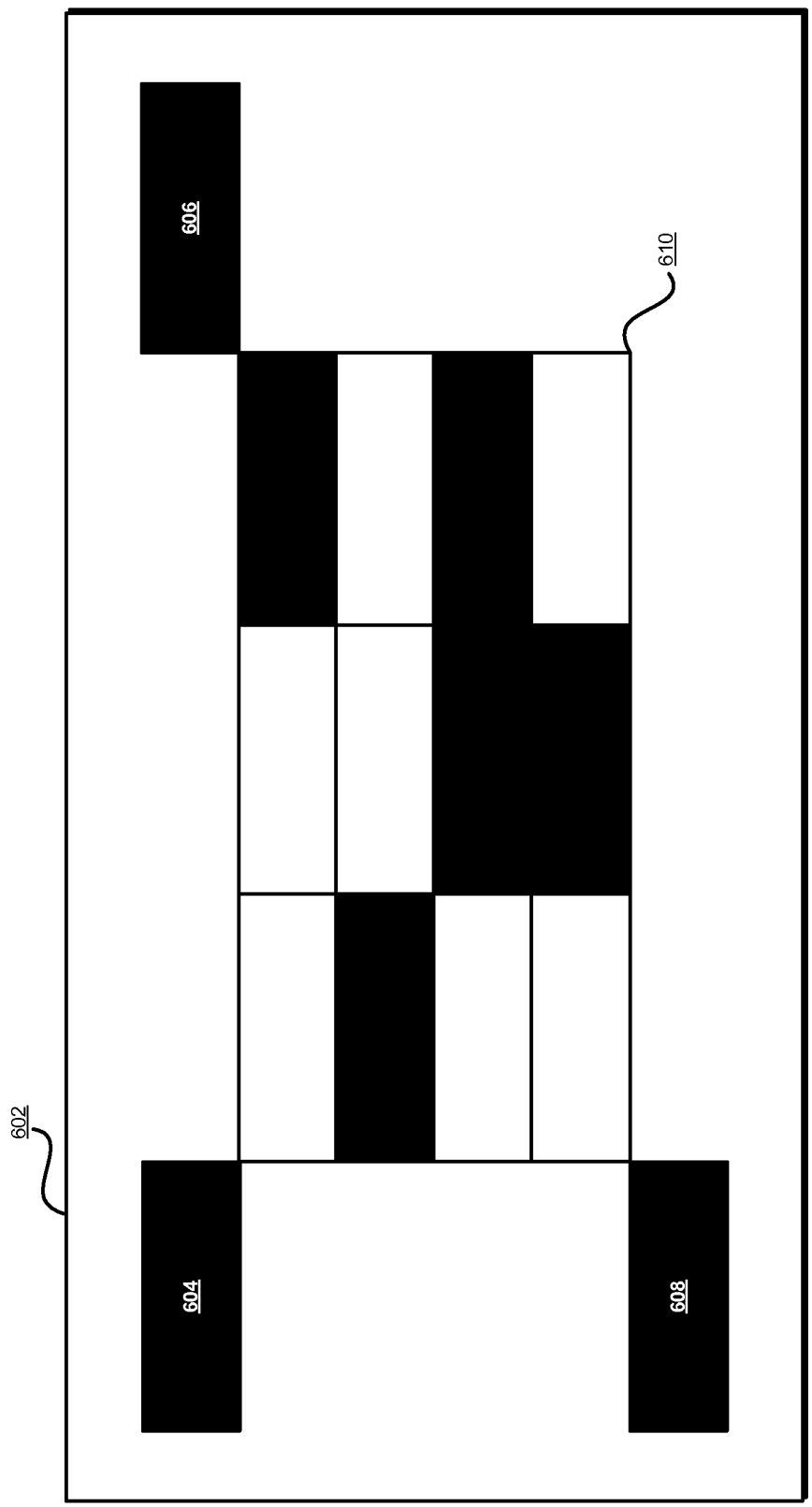
FIG. 6 depicts a block diagram of an example FV code in accordance with an illustrative embodiment.

With reference to FIG. 6, this figure depicts a block diagram of an example FV code in accordance with an illustrative embodiment. FV Code 602 is an example of FV code 302 in FIG. 3A, FV code 352 in FIG. 3B, FV code 402 in FIG. 4, or FV code 502 in FIG. 5. Any border or separator line shown in this figure is only illustrated for clarity of the description and is not a part of any FV code depicted in this figure.

Marker shapes 604, 606, and 608 together can operate in the manner of markers 304, 306, and 308 in FIG. 3A. Alternatively, marker 604 alone with a boundary of grid 610, or marker 606 alone with a boundary of grid 610, marker 608 alone with a boundary of grid 610, can also operate in the manner of FV code 502 in FIG. 5, to orient, calibrate, and bound FV code 602 for use with a reader.

An FV code according to an embodiment can be implemented using any suitable shape, not just squares. For example, FV code 602 employs rectangular shapes. Whichever of markers 604, 606, and 608 are used calibrates a reader to read the shapes used for encoding in FV code 602. A reader then segments grid 610 according to that shape—a rectangle in the present example—and reads the encoded rule, encoded data, or both.

With reference to FIG. 7, this figure depicts a block diagram of an example FV code in accordance with an illustrative embodiment. FV Code 702 is an example of FV code 602 in FIG. 6. Any border or separator line shown in this figure is only illustrated for clarity of the description and is not a part of any FV code depicted in this figure.

Marker shapes 704, 706, and 708 together can operate in the manner of markers 304, 306, and 308 in FIG. 3A. Alternatively, marker 704 alone with a boundary of grid 710, or marker 706 alone with a boundary of grid 710, marker 708 alone with a boundary of grid 710, can also operate in the manner of FV code 502 in FIG. 5, to orient, calibrate, and bound FV code 702 for use with a reader.

An FV code according to an embodiment can be implemented using any suitable shape, not just quadrilaterals. For example, FV code 702 employs triangular shapes. Whichever of markers 704, 706, and 708 are used calibrates a reader to read the shapes used for encoding in FV code 702. A reader then segments grid 710 according to that shape—a right triangle in the present example—and reads the encoded rule, encoded data, or both.

Note that some shapes can be oriented differently within grid 710. For example, shapes 1 and 2 are the same shape as marker 704, but shape 1 is oriented differently than marker 704 whereas shape 2 is oriented similar to marker 704. Other shapes 3, 4, 5, 6, 7, 8, and others are also oriented in the manner of shapes 1 and 2, but can be oriented in other ways as may be geometrically possible.

For example, in an alternate form, FV code 702 may take the form of FV code 702A and employ grid 710A. Any of markers 704, 706, and 708 can be oriented in any manner geometrically possible. For example, marker 704 can be oriented in any of orientations 704A, 704B, 704C, or 704D in FV code 702A. Similarly, marker 706 can be oriented in any of orientations 706A, 706B, 706C, or 706D, based on the orientations of other markers in FV code 702A, or independent of the orientations of other markers in FV code 702A. Similarly, marker 708, if used, can be oriented in any of orientations 708A, 708B, 708C, or 708D, based on the orientations of other markers in FV code 702A, or independent of the orientations of other markers in FV code 702A.

Note that the various alternative orientations for the markers are depicted in FIG. 7 only for the clarity of the description. The unselected alternatives are not printed or presented when FV code 702A is presented. The various alternative orientations for the markers can also apply to the orientations possible for the shapes within gird 710A. For example, shapes 1 and 2 in grid 710A may be oriented in the manner of shapes 1 and 2 in grid 710 but shapes 9 and 10 may be oriented differently in grid 710A as depicted in this non-limiting example.

Just as different colors from a selected palette can be used to communicate information, to wit, a value in a corresponding Number system, an orientation in combination with the palette can extend the palette. For example, a palette of two colors, in combination with four possible orientations as in grid 710A, can result in an effective palette of 8 (2*4), for Base 8 representation of information in an FV code.

Figure 8:
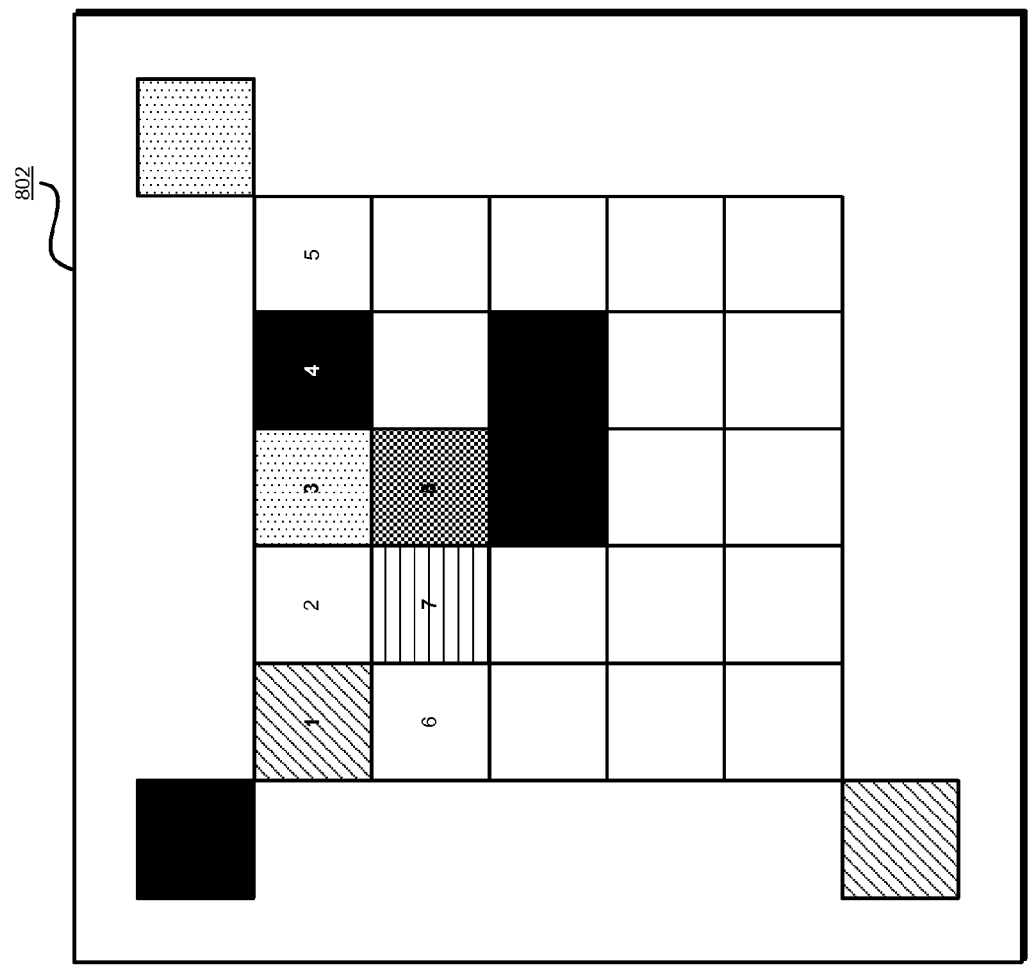
FIG. 8 depicts a block diagram of an example FV code in accordance with an illustrative embodiment.

With reference to FIG. 8, this figure depicts a block diagram of an example FV code in accordance with an illustrative embodiment. FV Code 802 is an example of FV code 602 in FIG. 6 or FV codes 702 or 702A in FIG. 7. Any border or separator line shown in this figure is only illustrated for clarity of the description and is not a part of any FV code depicted in this figure.

The selection of a larger palette can enable the use of a higher order Base Number system as described herein. As an example, FV code 802 is depicted as using a palette of a six, having an example combination of two colors (black and white) and four patterns. The four patterns can be four other colors as described elsewhere but only depicted as patterns in the black and white patent drawing of FIG. 8. For example, shape 1 is of a first pattern or color, shape 2 is of a second pattern or color, shape 3 is of a third pattern or color, shape 4 is of a fourth pattern or color, shape 5 is of the second pattern or color, shape 6 is also of the second pattern or color, shape 7 is of a fifth pattern or color, and shape 8 is of a sixth pattern or color in the example depiction of FIG. 8. Other shapes use one of these patterns or colors from the selected palette. Within the scope of the illustrative embodiments, the markers can be colored, shaded, or patterned uniformly using one selected color, shade, or pattern, (not shown) or using different colors, shades, or patterns, from the selected palette as shown in the example depiction of FIG. 8.

Figure 9:
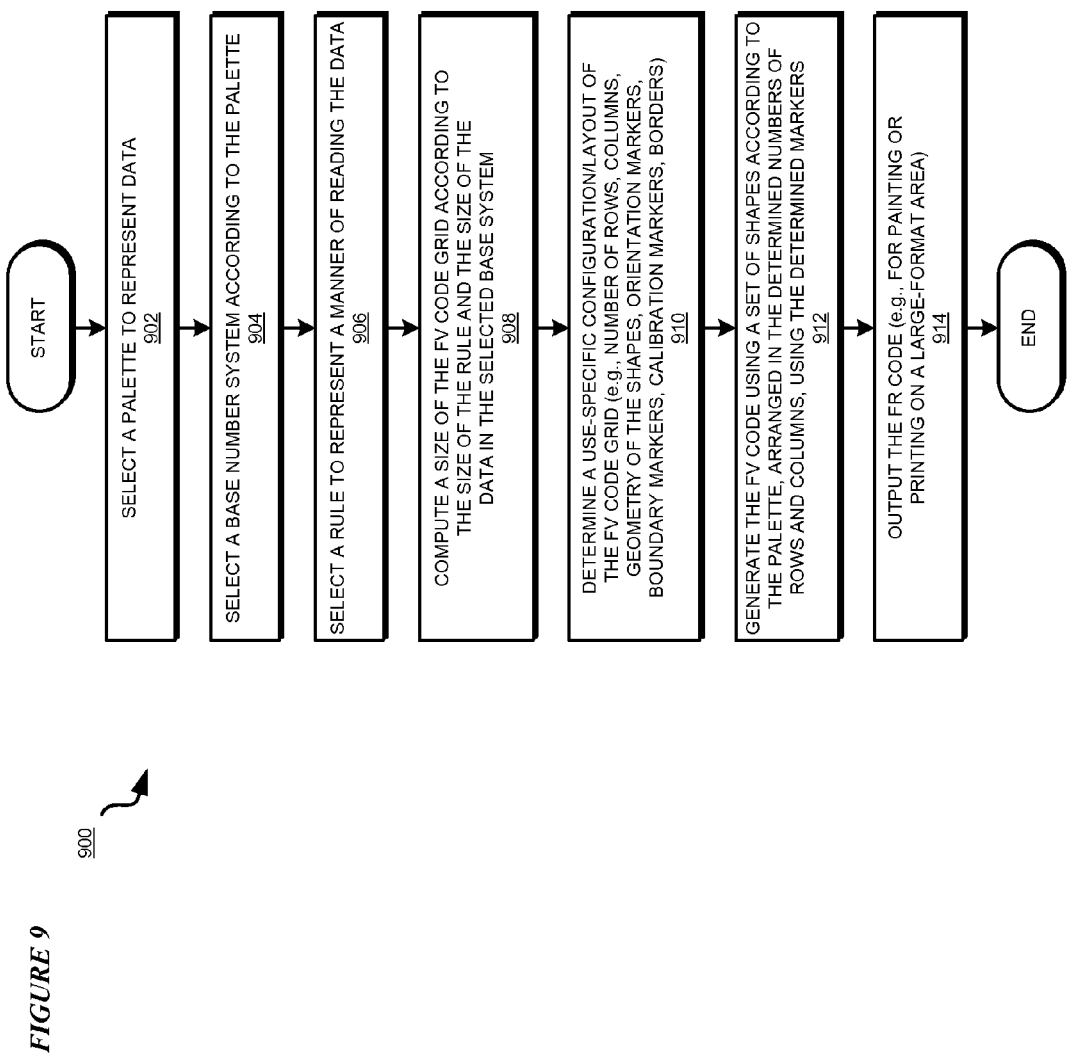
FIG. 9 depicts a flowchart of an example process for creating the far view two-dimensional symbology in accordance with an illustrative embodiment.

With reference to FIG. 9, this figure depicts a flowchart of an example process for creating the far view two-dimensional symbology in accordance with an illustrative embodiment. Process 900 can be implemented in application 105 in FIG. 1.

The application selects a palette for representing data in an FV code (block 902). The application selects a Base number system according to the palette (block 904). The application selects a rule to represent a manner of reading the data from the FV code, e.g., a rule to represent a type of the encoded data, such as an IP address, a URL, or a phone number (block 906).

The application computes a size of the FV code grid according to the size of the rule and the size of the data in the selected Base number system (block 908). For example, the application may determine in block 908 that the FV grid needs 600 shapes to represent the amount of data plus sixteen shapes to represent the rule in the FV code, where the 616 shapes (assuming no delimiter) will be coded in Base 16 using a palette or effective palette of 16 colors, shapes, patterns, shape orientations, or some combination thereof.

The application determines a use-specific configuration or layout of the FV code grid (block 910). For example, the application determines a number of rows and number of columns in the grid such that the overall shape of the grid will fit a given shape of an elongated rectangular roof-top or road-side.

In one embodiment, the use-specific configuration of the grid may be a default configuration of the grid. In another embodiment, the application further determines the configuration of the grid by determining the geometry of the shapes to be used in the grid, the markers to be used, any borders to be used, or some combination thereof. As a non-limiting example, if the application determines that the FV code will use three markers, the application may select a longer row as compared to when a single marker in conjunction with a border will identify the boundary of the FV code grid.

The application generates the FV code using the set of shapes according to the selected palette, arranging the set of shapes in the determined numbers of rows and columns, using the determined markers and optional borders (block 912). The application outputs the FV code, e.g., for printing or painting on a large-format area (block 914). The application ends process 900 thereafter. Process 900 is usable to produce FV codes for small-formal printing as well, such as for labels affixed on boxes or uneven surfaces or irregular shaped areas.

Thus, a system or apparatus, and computer program product are provided in the illustrative embodiments for creating the far view two-dimensional symbology. Where an embodiment or a portion thereof is described with respect to a type of device, the system or apparatus, the computer program product, or a portion thereof, are adapted or configured for use with a suitable and comparable manifestation of that type of device.

An FV code is easier and more accurate to present on a large-format area, as compared to an existing code, because of the modular design of the FV code. A printing or painting process for an example FV code may be as simple as laying out a grid pattern and filling in the black squares. A square master plate could be repeatedly applied to form the grid, or several easily cut square patterns could be laid out in the grid to print or paint the example FV code. Because of the simple design of the FV code, reading or photographing the FV code is easier and more accurate, even at oblique angles as compared to an existing code, especially from far distances of thousands of yards (meters), even from space. The print/paint quality control of an FV code is easier than controlling the large-format print quality of existing 2D symbols, thereby reducing the cost and lead time to print or paint the encoded information. The rules of reading the encoded data embedded in the FV codes allow the flexibility in encoding the data for variety of purposes without having to create new encoded forms of the data for different applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising a computer readable storage device including computer usable code for encoding information into a two-dimensional (2D) symbol, the computer usable code, when executed using a processor and a memory of a computer, cause the computer to carry out steps of a method, the method comprising:
    selecting, using the processor and the memory, a palette to represent data in the 2D symbol, the palette comprising a set of shape fillers, wherein the set of shape fillers comprises a plurality of patterns, each pattern configured to communicate a different meaning of the data when decoded;
    computing, using the processor and the memory, a size of the palette;
    computing, using the processor and the memory, a Base number system as a function of the size of the palette;
    selecting, using the processor and the memory, a rule, wherein the rule specifies a reading pattern for reading an encoded form of the data from the 2D symbol, wherein the reading pattern is one pattern in a plurality of reading patterns and communicates one specific reading pattern of the data;
    encoding, using the processor and the memory, the rule and the data as a set of shapes, wherein the shapes in the set of shapes are configured using the palette and arranged into a grid to form the 2D symbol; and
    outputting, using the processor and the memory, the 2D symbol in a size that matches an area.

2. The computer usable program product of claim 1, wherein the computer usable code is stored in a computer readable storage device in a data processing system, and wherein the computer usable code is transferred over a network from a remote data processing system.

3. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

4. The computer usable program product of claim 1, wherein the method further comprises:
    selecting a geometrical shape to represent the data in the 2D symbol, wherein each shape in the set of shapes is of the geometric shape; and
    selecting a number of shapes in the set of shapes, wherein the number of shapes is at least a smallest number of shapes which when configured according to the palette represents the data and the rule in the selected Base number system.

5. The computer usable program product of claim 1, wherein the method further comprises:
    computing a number of rows in the grid;
    computing a number of columns in the grid; and
    arranging the set of shapes in the computed number of rows and the computed number of columns.

6. The computer usable program product of claim 5, wherein the method further comprises:
    determining a layout of a large format area, wherein the area is a printable portion of the large format area, and wherein the layout comprises a length of the area and a width of the area; and
    determining, as a part of the computing the number of columns, a number of shapes that fit in the length of the area.

7. The computer usable program product of claim 1, wherein the method further comprises:
    configuring, as a part of the 2D symbol, outside the grid, a set of marker shapes, wherein all data is encoded using the set of shapes within the grid, wherein a marker shape in the set of marker shapes and a shape in the set of shapes have identical geometric parameters.

8. The computer usable program product of claim 7, wherein the set of marker shapes includes a first marker shape, a second marker shape, and a third marker shape, wherein the method further comprises:
    computing a length of the grid as a distance between the first marker shape and the second marker shape;
    computing a number of columns in the grid using the length of the grid;
    computing a height of the grid as a distance between the first marker shape and the third marker shape;
    computing a number of rows in the grid using the height of the grid; and
    computing a number of shapes in the grid using the geometric parameters of the single marker shape.

9. The computer usable program product of claim 8, wherein the set of marker shapes includes a single marker shape, wherein the method further comprises:
    configuring, as another part of the 2D symbol, a first border edge of the grid and a second border edge of the grid;
    computing a length of the grid as a distance between the single marker shape and the first border edge;
    computing a number of columns in the grid using the length of the grid;

computing a height of the grid as a distance between the single marker shape and the second border edge;
computing a number of rows in the grid using the height of the grid; and
computing a number of shapes in the grid using the geometric parameters of the single marker shape.

10. The computer usable program product of claim 1, wherein each shape in the set of shapes is a rectangular geometry wherein a length in the rectangular geometry is different from a height in the rectangular geometry.

11. The computer usable program product of claim 1, wherein each shape in the set of shapes comprises a triangular geometry.

12. The computer usable program product of claim 1, wherein the method further comprises:
determining a number of members in the set of shape fillers in the palette; and
selecting, as a Base number of the Base number system, the number of members in the set of shape fillers in the palette.

13. The computer usable program product of claim 1, wherein a first shape filler in the set of shape fillers comprises a first orientation, in the grid, of a shape in the set of shapes.

14. The computer usable program product of claim 1, wherein a first shape filler in the set of shape fillers comprises a first color and a second shape filler in the set of shape fillers comprises a second color.

15. The computer usable program product of claim 1, wherein a first shape filler in the set of shape fillers comprises a first shade of a color and a second shape filler in the set of shape fillers comprises a second shade of a color.

16. The computer usable program product of claim 1, wherein a first shape filler in the set of shape fillers comprises a first fill-pattern and a second shape filler in the set of shape fillers comprises a second fill-pattern.

17. The computer usable program product of claim 1, wherein the method further comprises:
selecting a delimiter, wherein the delimiter demarcates an encoded form of the rule from the encoded form of the data in the 2D symbol; and
encoding the delimiter in the 2D symbol using a shape from the set of shapes.

18. The computer usable program product of claim 17, wherein the method further comprises:
locating, by the presence of an encoded form of the delimiter at a position in the grid, the encoded form of the rule, wherein the position of the delimiter causes the encoded form of the rule to be unrestrictedly situated in the grid of the 2D symbol.

19. A data processing system for encoding information into a two-dimensional (2D) symbol, the data processing system comprising:
a storage device, wherein the storage device stores computer usable program code; and
a processor, wherein the processor executes the computer usable program code, to cause the data processing system to carry out steps of a method, the method comprising:
selecting a palette to represent data in the 2D symbol, the palette comprising a set of shape fillers, wherein the set of shape fillers comprises a plurality of patterns, each pattern configured to communicate a different meaning of the data when decoded;
computing a size of the palette;
computing a Base number system as a function of the size of the palette;
selecting a rule, wherein the rule specifies a reading pattern for reading an encoded form of the data from the 2D symbol, wherein the reading pattern is one pattern in a plurality of reading patterns and communicates one specific reading pattern of the data;
encoding the rule and the data as a set of shapes, wherein the shapes in the set of shapes are configured using the palette and arranged into a grid to form the 2D symbol; and
outputting the 2D symbol in a size that matches an area.

* * * * *